United States Patent [19]
Sato et al.

[11] 4,347,169
[45] Aug. 31, 1982

[54] ELECTRICAL INSULATING OIL AND OIL-FILLED ELECTRICAL APPLIANCES

[75] Inventors: Atsushi Sato, Tokyo; Naoya Takahashi, Yokohama; Keiji Endo, Yokohama; Hitoshi Yanagishita, Yokohama, all of Japan

[73] Assignee: Nippon Petrochemicals Company, Limited, Tokyo, Japan

[21] Appl. No.: 276,709

[22] Filed: Jun. 23, 1981

[30] Foreign Application Priority Data

| Jun. 30, 1980 | [JP] | Japan | 55-88924 |
| Jun. 30, 1980 | [JP] | Japan | 55-88925 |
| Jun. 30, 1980 | [JP] | Japan | 55-88926 |
| Jul. 22, 1980 | [JP] | Japan | 55-99380 |
| Jul. 22, 1980 | [JP] | Japan | 55-99381 |
| Jul. 22, 1980 | [JP] | Japan | 55-99382 |

[51] Int. Cl.³ .................. H01B 3/00; H05K 5/00; H01B 7/02; H01G 4/22
[52] U.S. Cl. .................. 252/567; 252/570; 174/17 LF; 174/25 C; 174/30; 174/31.5; 361/315; 361/319; 361/327; 585/6.3
[58] Field of Search ........... 252/567, 570; 361/315, 361/319, 327; 174/17 LF, 25 C, 31.5, 30; 585/436, 6.3

[56] References Cited
U.S. PATENT DOCUMENTS

| 3,812,407 | 5/1974 | Nose et al. | 317/258 |
| 4,068,286 | 1/1978 | Iijima et al. | 361/315 |
| 4,108,788 | 8/1978 | Schulz et al. | 260/671 G |
| 4,111,824 | 9/1978 | Schulz et al. | 260/671 G |
| 4,111,825 | 9/1978 | Schulz et al. | 260/671 G |

FOREIGN PATENT DOCUMENTS 1494 9/1978 European Pat. Off. .

Primary Examiner—Richard L. Schilling
Attorney, Agent, or Firm—Scully, Scott, Murphy & Presser

[57] ABSTRACT

An electrical insulating oil and oil-filled electrical appliances, in which the insulating oil comprises a mixture of diarylalkanes and alkyl-3-arylindane derivatives and/or 1,3-diarylbutene derivatives, and has various advantageous properties such as a high dielectric constant, hydrogen gas absorbing capacity, and adaptability to plastic film materials. By impregnating with the above insulating oil, high performance and long life electrical appliances can be manufactured.

16 Claims, No Drawings

ELECTRICAL INSULATING OIL AND OIL-FILLED ELECTRICAL APPLIANCES

BACKGROUND OF THE INVENTION (1) Field of the Invention

This invention relates to an electrical insulating oil and oil-filled electrical appliances that are impregnated with the insulating oil. More particularly, the invention relates to an insulating oil and oil-filled electrical appliances in which the insulating oil is composed of a miture of diarylalkanes and alkyl-3-arylindane derivatives and/or 1,3-diarylbutene derivatives. The term "insulating oil" herein referred to includes dielectric fluids.

(2) Description of the Prior Art

Electrical appliances such as capacitors, power cables and transformers have recently been made to withstand high electric voltages while made small in size. With this tendency, synthetic resin films or the like are used in place of or together with the conventional insulating paper. As a result, the properties required of electrical insulating oils have become quite severe.

In the conventional art, mineral oils, alkylbenzenes, polybutenes, alkylnaphthalenes, alkylbiphenyls and diarylalkanes have been proposed and used as electrical insulating oils for oil-filled electrical appliances. However, the performance of these insulating oils do not match the above-mentioned development in electrical appliances. In particular, the properties of such insulating oils are not satisfactory with regard to electrical appliances employing insulating materials made of synthetic resins.

With the requirement of high-voltage resistance and size reduction, it is necessary that the electrical insulating oils have a high dielectric breakdown voltage, low dielectric loss tangent, and good hydrogen gas absorbing capacity.

The hydrogen gas absorbing capacity indicates the stability of the insulating oil against corona discharge under high electric voltage conditions. The higher the gas-absorbing capacity, the smaller the likelihood of corona discharge, which leads to the advantage of the insulating oil having excellent stability or durability.

Meanwhile, in order to meet the requirement of high voltage use, plastic films such as polyolefin films, polystyrene films and polyester films are used in place of or as a part of the conventional insulating paper as insulating materials, or dielectric materials for electrical appliances such as oil-filled electric cables and capacitors. In view of their dielectric strength, dielectric loss tangent and dielectric constant, the polyolefin films, especially, polypropylene and cross-linked polyethylene films are preferred as the plastic films.

When these polyolefin films are impregnated with an insulating oil, some oils cause the films to swell to some extent. If a film becomes swollen, the thickness of insulating layer increases, as a result, the resistance to the insulating oil flow increases in cables, and insufficient impregnation of insulating oil occurs in electric capacitors, causing the formation of void spaces (unimpregnated portions) and the undesirable lowering of the corona voltage.

In connection with the above-mentioned conventional electrical insulating oils, the values of the dielectric breakdown voltages (BDV) and the dielectric loss tangents (tan δ) are satisfactory to some extent, but the hydrogen gas absorbing capacity or corona discharge characteristics and the size stability in connection with polypropylene films are not satisfactory.

BRIEF SUMMARY OF THE INVENTION

In view of the above-described conventional state of the art, it is the primary object of the present invention to provide an improved electrical insulating oil and oil-filled electrical appliances which are impregnated with the improved insulating oil and are free from the above-described disadvantages in the conventional art.

Another object of the present invention is to provide an electrical insulating oil which has an excellent dielectric constant and other electrical properties, which has good hydrogen gas absorbing capacity, and which is highly adaptable to plastic film insulating materials.

It is a further object of the present invention to provide oil-filled electrical appliances which have excellent corona discharge characteristics, dielectric breakdown voltage and other electrical characteristics and has a long life.

In accordance with the present invention, the electrical insulating oil consists of:

(a) at least one diarylalkane; and (b) at least one member selected from the group consisting of compounds represented by the following general formulae:

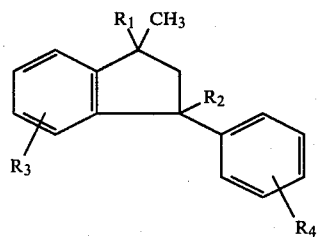
(I)

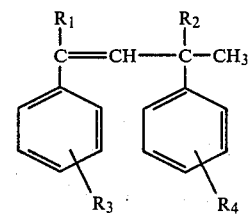
(II)

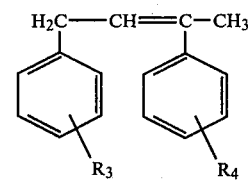
(III)

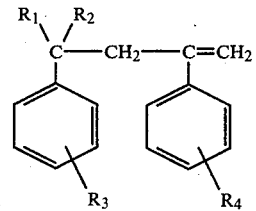
(IV)

wherein each of $R_1$ to $R_4$ is a hydrogen atom or a methyl group and the total number of carbon atoms in $R_1$ to $R_4$ is an integer from zero to 2.

The electrical appliances according to the present invention are those which are impregnated with the abovedefined electrical insulating oil.

DETAILED DESCRIPTION OF THE INVENTION

The electrical appliances referred to in the present invention include electric cables, capacitors, transformers and the like which are impregnated with the electrical insulating oils of the present invention.

As the electrical insulating materials, insulating paper, synthetic resin films, and their combinations can be used. More particularly, in the case of electric capacitors, the insulating materials (dielectrics) can be made of insulating paper, a combination of insulating paper and polypropylene film, or polypropylene film alone. The insulating materials for oil-filled cables are exemplified by insulating paper, a laminated material of insulating paper with a polyolefin film such as a polyethylene or polypropylene film, a combined film which is prepared by cross-linking silane-grafted polyethylene with insulating paper in the presence of a silanol catalyst, or films which are prepared by using a polyolefin film such as a polyethylene film or polypropylene film in place of the above insulating paper.

The oil-filled electrical appliances using any of the above insulating materials are included in the present invention; however, the characteristic advantage of the present invention can be obtained when the above-defined insulating oil is used together with an insulating material (dielectric material) which includes at least partially, a synthetic resin film.

The foregoing diarylalkanes used for the insulating oil of the present invention have preferably a viscosity of 7 cSt or less at 40° C. as the sole component or a mixture component thereof. Among the diarylalkanes, diarylmethanes an diarylethanes are preferable. More preferred among these are arylphenylethanes represented by the following general formula (V):

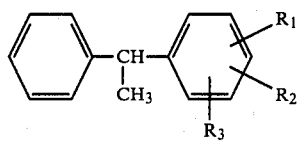

wherein each of $R_1$ to $R_3$ is a hydrogen atom or an alkyl group having 1 to 3 carbon atoms, and the total carbon atom number of $R_1$ to $R_3$ is an integer of 3 or less.

Exemplified as the diarylalkanes are 1-phenyl-1-(dimethylphenyl)methane, 1,1-diphenylethane; 1,1-di(-methylphenyl)ethane; 1,1-di(ethylphenyl)ethane; 1-phenyl-1-(methylphenyl)ethane; 1-phenyl-1-(dimethylphenyl)ethane; 1-phenyl-1-(ethylphenyl)ethane; 1-phenyl-1-(methylethylphenyl)ethane; 1-phenyl-1-(isopropylphenyl)ethane; and 1-phenyl-1-(trimethylphenyl)ethane. The diarylethanes can easily be prepared by reacting styrene or alkylstyrene with benzene or alkylbenzene having $C_1$ to $C_3$ alkyl groups in the presence of a Lewis acid catalyst or an acid catalyst such as silica alumina or another solid acid catalyst. Further, these compounds can be obtained by separation from the byproduct in ethylbenzene preparation. The diarylmethanes can be prepared by reacting aromatic compounds with formaldehyde in the presence of acid catalysts, or by reacting benzylhalides or alkylated benzylhalides with benzene or alkylbenzenes. One member or a mixture of two or more of these diarylalkanes can be used for preparing the insulating oil of the present invention.

The alkyl-3-arylindane derivatives that are represented by the foregoing general formula (I) can be prepared by dimerizing styrene or alkyl derivatives thereof in the presence of an acid catalyst such as a solid acid catalyst.

Among the alkyl-3-arylindane derivatives, the desirable compounds are dimers of styrene, α-methylstyrene or vinyltoluene. And 1-methyl-3-phenylindane is especially preferable.

The 1,3-diarylbutene derivatives that are represented by the foregoing general formulae (II) to (IV) are also prepared by dimerizing styrene or its alkyl derivatives in the presence of an acid catalyst such as solid acid catalyst or a super acid. These butene derivatives have a common 1,3-diphenylbutene skeletal structure and they are exemplified by 1,3-diphenylbutene-1; 1,3-diphenylbutene-2; 1,3-dimethyl-1,3-diphenylbutene-1 (or 4-methyl-2,4-diphenylpentene-2); 1,3-di(methylphenyl)butene-1; 1,3-di(methylphenyl)butene-2; and 1,1-dimethyl-1,3-diphenylbutene-3 (or 4-methyl-2,4-diphenylpentene-1).

Although the diarylalkanes themselves have excellent electrical properties and are good in thermal stability, oxidation stability and biodegradability, when they are used in a mixture with an alkyl-3-arylindane derivative and the mixture is applied to the electrical appliances having a plastic insulating material of polypropylene film or the like, the size stability of such a plastic insulating material can be much improved.

The alkyl-3-arylindane derivatives themselves also excel in biodegradability, thermal resistance, oxidation resistance and various electrical properties. However, they generally have high pour points. For example, 1-methyl-3-phenylindane has a pour point of about −35° C., so that it is not always satisfactory when used alone. When the alkyl-3-arylindane derivative is used together with the diarylalkane, the size stability of the plastic insulating material can be improved as described above; in addition, the viscosity of the electrical insulating oil can be adjusted to a desirable range.

The mixing ratio of the alkyl-3-arylindane derivatives to the diarylalkanes is arbitrary; however, a ratio of 0.01 to 9 parts by weight of alkyl-3 arylindane derivatives to 1 part by weight of diarylalkanes is desirable in view of their synergetic effects.

In addition to the above-mentioned advantageous properties, the dialylalkanes have good hydrogen gas absorbing capacity. When the diarylalkanes are used in a mixture with other components of 1,3-diarylbutene derivatives, the hydrogen gas absorbing capacity can further be improved. In addition, in spite of the mixing with unsaturated compounds of 1,3-diarylbutene derivatives, no deterioration in biodegradability, thermal stability and oxidation stability is observed, and various electrical properties can be improved.

The mixing ratio of the 1,3-diarylbutene derivatives to the diarylalkanes is arbitrary. However, a ratio of 0.001 to 0.2 part by weight of 1,3-diarylbutene derivatives to 1 part by weight of diarylalkanes is preferable in view of their synergetic effects.

Furthermore, by mixing the diarylalkane with both the alkyl-3-arylindane derivative and the 1,3-diarylbutene derivative, when the mixture is used for electrical appliances to impregnate the plastic insulating material therein made of polypropylene or the like, the size stability of the insulating material is much improved and the hydrogen gas absorbing capacity is also improved, thereby improving the performance of oil-filled electrical appliances. It should be noted that the improvement is greater than in the case in which any one of the latter two components alone is mixed to the diarylalkane.

The mixing ratio among the three constituents of diarylalkanes, alkyl-3-arylindane derivatives, and 1,3-diarylbutene derivatives can be selected arbitarily. However, it is preferable in view of their synergetic effects that 0.01 to 9 parts by weight of alkyl-3-arylindane derivatives and 0.001 to 0.2 part by weight of 1,3-diarylbutene derivatives be mixed with 1 part by weight of diarylalkanes.

Since the insulating oil prepared according to the present invention has various advantageous properties as described above, it can be used for electrical capacitors, cables, transformers, and other electrical appliances. As compared with other hydrocarbon insulating oils, the insulating oil of the present invention has an excellent dielectric constant, hydrogen gas absorbing capacity, and adaptability to polyethylene or polypropylene films. Therefore, the electrical insulating oil of the present invention is quite suitable for use in electric capacitors and cables containing plastic films as insulating materials.

The electrical insulating oil of the present invention is made of a mixture having the above-described composition; however, the present invention is not restricted to the foregoing composition.

That is, in order to improve the desired electric characteristics without impairing the general electric properties, polybutene, mineral oils, alkylbenzenes, alkylnaphthalenes, alkylbiphenyls, partially hydrogenated terphenyls and other aromatic insulating oils can be added to the insulating oil of the present invention. When polybutene is added, the volume resistivity and dielectric loss tangent can be improved. The addition of mineral insulating oils can improve the breakdown voltage and the addition of alkylbenzenes or other aromatic insulating oils can improve the breakdown voltage, dielectric loss tangent and pour point. However, it is not desirable to contain these insulating oils in amounts above 50% because, in all cases, the dielectric constant is lowered. Incidentally, a small quantity of antioxidant may be added, if desired. Further, other known additives for insulating oils such as phosphoric esters and epoxy compounds can also be added.

The oil-filled electrical appliances impregnated with the insulating oil of the present invention has the following characteristic advantages.

With the use of the insulating oil of the present invention, the size stability of the plastic insulating materials becomes good. Therefore, in the case of power cables, the size change of insulating material by swelling is small, and the resistance to insulating oil flow can be kept low so that the oil impregnation can be completed in a short time. When a cable is made by using an insulating material of a laminate of plastic film and insulating paper, peeling, creasing and buckling of the insulating material by the bending of the cable do not occur even when the insulating material is in contact with the insulating oil for a long time; therefore, a cable having a long life can be manufactured.

In the case of electric capacitors, the impregnation of insulating oil can be performed satisfactorily without the formation of voids because the plastic film material is hardly swollen by the insulating oil of the present invention. Accordingly, the corona discharge rarely occurs and the occurrence of dielectric breakdown can well be avoided to give a long life.

Furthermore, the insulating oil of the present invention has excellent hydrogen gas absorbing capacity, the corona resistance under high voltage stress becomes good, giving several oil-filled electrical appliances of long life.

According to the present invention, the above-described features of electrical appliances can be improved by impregnating with the insulating oil consisting of a plurality of specified component materials. Further, the advantageous electrical characteristics, biodegradability, thermal resistance and oxidation stability of each component material can well be maintained, and the viscosity and pour point of the insulating oil composition can be adjusted within desirable ranges. Therefore, the manufacture of oil-filled electrical appliances can be facilitated, and oil-filled electrical appliances with high performance at any conditions can be obtained.

In the following, the electrical insulating oil and electrical appliances impregnated therewith according to the present invention will be described in more detail with reference to several examples.

EXAMPLES AND COMPARATIVE EXAMPLES

(1) Preparation of Insulating Oils and Their Electrical Characteristics

Samples of insulating oils were prepared according to the compositions indicated in the following Table 1. In this table, Insulating Oils 3 to 8 are examples of the present invention, and Insulating Oils 1, 2 and 9 are comparative examples.

The above insulating oils were subjected to electrical characteristic tests, the results of which are shown in the following Table 2. The test items of pour point, flash point and electrical properties were all tested in accordance with JIS C 2101. The oxidation stability was tested by heating the samples at 115° C. for 96 hours in air. The hydrogen gas absorbing capacity was measured according to the test method standardized by the Electrical Insulating Oil Research Society of the Japan Petroleum Institute.

(2) Adaptability of Insulating Oils to Polypropylene Film

The adaptability of insulating oils in Table 1 relative to polypropylene film was tested.

(a) Test of Thickness Change

Ten sheets of a composite film were put in layers. The structure of the composite film was: KIP/PPF/KIP and the thicknesses were 43 $\mu$/49 $\mu$/43 $\mu$ in that order, wherein KIP means kraft insulating paper and PPF, polypropylene film. The layered materials were dried at 100° C. for 24 hours under a pressure of 1 Kg/cm$^2$. After that, they were impregnated with the insulating oils under the same pressure and temperature.

The changes of thicknesses are shown in the following Table 3, in which the values are represented in percentage relative to the thicknesses before drying. The thickness change observed was very slight after 24 hours' impregnation.

Since the thickness change rates of the kraft insulating paper are regarded as all the same in the respective insulating oils, the differences of the values of thickness change rates in Table 3 indicate the differences of the degrees of thickness changes of the polypropylene films with the respective insulating oils.

(b) Dissolution Test

Extruded polypropylene film (thickness: 49μ) was immersed in a certain quantity of each insulating oil at 100° C. for 40 days. The polypropylene dissolved in the insulating oil was precipitated by adding methanol to each insulating oil, thereby determining the quantity of the polypropylene which dissolved. The results of this test are shown in the following Table 4.

From the above test results shown in Tables 2, 3 and 4, it will be understood that the insulating oils of the present invention are quite good in various properties, and the adaptability thereof relative to polyolefin films is also good.

(3) Test of Oil-Filled Capacitor

Three sheets of polypropylene films (thickness: 18μ) were superposed, and the combination was used as a dielectric. Aluminum foil (thickness: 6μ; width: 80 mm) was used as a material for electrodes. The above materials in a 9.5 m length were layered and wound through the ordinary method to form model capacitors.

In a vacuum, the capacitors were impregnated with the foregoing insulating oils to prepare oil-filled capacitors of about 0.5 μF electrostatic capacitance. By applying electric voltage to the capacitors thus prepared, corona starting voltage (CSV) and corona ending voltage (CED) were measured at 30° C.

The results are shown in the following Table 5a.

Further, an electric voltage 1.5 times higher than the rated voltage was continuously applied to ten of each kind of the above capacitors at a temperature of 30° C. for 180 days. The number of broken-down capacitors per 10 capacitors is shown in the following Table 5b for each kind of capacitor.

(4) Test of Oil-Filled Cable

According to the following procedure, model cables were formed and they were tested.

(a) Preparation of Polypropylene-Kraft Paper Composite Films

Two sheets of 43μ thick kraft paper were joined using a polypropylene film by fusion to prepare a polypropylene-kraft insulating paper composite film as a dielectric. The layer constitution of the composite film thus obtained was KIP (43μ)/PPR (49μ)/KIP (43μ), wherein KIP means kraft insulating paper and PPF, polypropylene film.

(b) Preparation of Oil-Filled Cable

The above dielectric film of 20 mm width was wound on a copper pipe of 30 mm in diameter as a conductor. The pressure of winding was 0.5 Kg/20 mm, and the thickness of the wound dielectric was 4.5 mm.

The wound layer was covered with a corrugated aluminum sheet with carbon paper interpored therebetween, which was followed by drying at 110° C., 10⁻³ mmHg for 12 hours. It was then impregnated with a degasified and dried insulating oil to obtain each model cable.

(c) Test of Oil-Filled Cable

In connection with the above model cables, the impulse breakdown strengths before and after heating at 100° C. for 30 days were measured. Further, the rate of thickness change before and after the heating was also determined. The results of these tests are shown in the following Table 6.

It will be understood from the results shown in the following tables that the oil-filled electrical appliances according to the present invention are excellent in several electrical characteristics.

TABLE 1

| Composition of Insulating Oil | | |
|---|---|---|
| Insulating Oil | Component | Parts by Weight |
| 1 | 1-Phenyl-1-(3,4-dimethylphenyl)ethane | (Sole) |
| 2 | 1-Methyl-3-phenylindane | (Sole) |
| 3 | 1-Phenyl-1-(3,4-dimethylphenyl)ethane | 90 |
|   | 1-Methyl-3-phenylindane | 10 |
| 4 | 1-Phenyl-1-(3,4-dimethylphenyl)ethane | 40 |
|   | 1-Phenyl-1-(2,4-dimethylphenyl)ethane | 30 |
|   | 1-Phenyl-1-(2,5-dimethylphenyl)ethane | 8 |
|   | 1-Phenyl-1-(ethylphenyl)ethane | 14 |
|   | 1-Methyl-3-phenylindane | 8 |
| 5 | 1-Phenyl-1-(3,4-dimethylphenyl)ethane | 95 |
|   | 1,3-Diphenylbutene-1 | 5 |
| 6 | 1-Phenyl-1-(3,4-dimethylphenyl)ethane | 42 |
|   | 1-Phenyl-1-(2,4-dimethylphenyl)ethane | 31 |
|   | 1-Phenyl-1-(2,5-dimethylphenyl)ethane | 8 |
|   | 1-Phenyl-1-(ethylphenyl)ethane | 14 |
|   | 1,3-Diphenylbutene-1 | 5 |
| 7 | 1-Phenyl-1-(3,4-dimethylphenyl)ethane | 88 |
|   | 1-Methyl-3-phenylindane | 10 |
|   | 1,3-Diphenylbutene-1 | 2 |
| 8 | 1-Phenyl-1-(3,4-dimethylphenyl)ethane | 38 |
|   | 1-Phenyl-1-(2,4-dimethylphenyl)ethane | 30 |
|   | 1-Phenyl-1-(2,5-dimethylphenyl)ethane | 8 |
|   | 1-Phenyl-1-(ethylphenyl)ethane | 14 |
|   | 1-Methyl-3-phenylindane | 8 |
|   | 1,3-Diphenylbutene-1 | 2 |
| 9 | Mineral oil | (Sole) |

TABLE 2

| Electrical Characteristics | | | | | |
|---|---|---|---|---|---|
|  | Insulating Oil | | | | |
| Test Item | 1 | 2 | 3 | 4 | 5 |
| Flash Point (PMCC, °C.) | 155 | 154 | 155 | 152 | 156 |
| Pour Point (°C.) | <−50(*1) | −35 | <−50 | −47.5 | <−50 |
| Kinematic Viscosity (cSt, 100° F.:37.8° C.) | 5.1 | 7.3 | 5.3 | 5.5 | 5.4 |
| Dielectric Breakdown Voltage (kV/2.5mm) | >70(*2) | >70 | >70 | >70 | >70 |
| Dielectric Loss Tangent (%, at 80° C.) | 0.022 | 0.009 | 0.019 | 0.008 | 0.015 |
| Volume Resistivity (Ωcm, at 80° C.) | $7.8 \times 10^{14}$ | $5.3 \times 10^{14}$ | $7.1 \times 10^{14}$ | $6.0 \times 10^{15}$ | $8.1 \times 10^{14}$ |
| Dielectric Constant | 2.54 | 2.61 | 2.55 | 2.51 | 2.50 |
| Oxidation Stability (After treatment of 115° C. × 96 hrs) | | | | | |
| Dielectric Loss Tangent (%, at 80° C.) | 0.06 | 0.07 | 0.05 | 0.06 | 0.08 |
| Volume Resistivity (Ωcm, at 80° C.) | $5.5 \times 10^{13}$ | $4.5 \times 10^{13}$ | $1.0 \times 10^{14}$ | $7.4 \times 10^{13}$ | $3.3 \times 10^{13}$ |
| Hydrogen Gas Absorbing Capacity (mm-oil, Applied Voltage: 8 kV | | | | | |

TABLE 2-continued

| | Electrical Characteristics | | | | |
|---|---|---|---|---|---|
| Temp.: 50° C., Duration: 30 min.) | −92 | −94 | −92 | −96 | −150 |

| | Insulating Oil | | | |
|---|---|---|---|---|
| Test Item | 6 | 7 | 8 | 9 |
| Flash Point (PMCC, °C.) | 154 | 155 | 152 | 135 |
| Pour Point (°C.) | −47.5 | <−50 | −47.5 | −45 |
| Kinematic Viscosity (cSt, 100° F.:37.8° C.) | 5.5 | 5.4 | 5.6 | 9.5 |
| Dielectric Breakdown Voltage (kV/2.5mm) | >70 | >70 | >70 | 50 |
| Dielectric Loss Tangent (%, at 80° C.) | 0.010 | 0.014 | 0.009 | 0.074 |
| Volume Resistivity (Ωcm, at 80° C.) | $9.0 \times 10^{14}$ | $7.1 \times 10^{14}$ | $1.0 \times 10^{15}$ | $2.0 \times 10^{13}$ |
| Dielectric Constant | 2.47 | 2.53 | 2.50 | 2.17 |
| Oxidation Stability (After treatment of 115° C. × 96 hrs) | | | | |
| Dielectric Loss Tangent (%, at 80° C.) | 0.08 | 0.06 | 0.08 | 0.18 |
| Volume Resistivity (Ωcm, at 80° C.) | $2.0 \times 10^{13}$ | $9.5 \times 10^{13}$ | $4.0 \times 10^{13}$ | $2.4 \times 10^{12}$ |
| Hydrogen Gas Absorbing Capacity (mm-oil, Applied Voltage: 8 kV Temp.: 50° C., Duration: 30 min.) | −145 | −115 | −112 | −20 |

Notes:
(*1) <−50 means −50 or below
(*2) >70 means 70 or above

TABLE 3

| | Rate of Thickness Change (%) | | | | |
|---|---|---|---|---|---|
| Insulating Oil | Before Start of Drying | After Drying | After Impregnation | | |
| | | | 24 hrs | 48 hrs | 72 hrs |
| 1 | 0 | −4 | 2.0 | 2.0 | 2.0 |
| 2 | 0 | −4 | 1.0 | 1.0 | 1.1 |
| 3 | 0 | −4 | 1.3 | 1.4 | 1.4 |
| 4 | 0 | −4 | 1.3 | 1.4 | 1.4 |
| 5 | 0 | −4 | 1.9 | 2.0 | 2.0 |
| 6 | 0 | −4 | 2.0 | 2.0 | 2.0 |
| 7 | 0 | −4 | 1.3 | 1.3 | 1.3 |
| 8 | 0 | −4 | 1.3 | 1.4 | 1.4 |
| 9 | 0 | −4 | 8.1 | 8.2 | 8.2 |

TABLE 4

| | Dissolution Test |
|---|---|
| Insulating Oil | Dissolved Quantity |
| 1 | 1.6 wt % |
| 2 | 1.0 wt % |
| 3 | 1.2 wt % |
| 4 | 1.3 wt % |
| 5 | 1.5 wt % |
| 6 | 1.5 wt % |
| 7 | 1.0 wt % |
| 8 | 1.2 wt % |
| 9 | 2.0 wt % |

TABLE 5a

| | Corona Voltage (kV/mm) | |
|---|---|---|
| Insulating Oil | CSV | CEV |
| 1 | 119 | 105 |
| 2 | 120 | 104 |
| 3 | 120 | 106 |
| 4 | 120 | 105 |
| 5 | 130 | 114 |
| 6 | 132 | 115 |
| 7 | 129 | 113 |
| 8 | 128 | 113 |
| 9 | 55 | 11 |

TABLE 5b

| | Number of Broken-Down Capacitors per Ten Capacitors | | | | | |
|---|---|---|---|---|---|---|
| Insulating Oil | Days of Voltage Application | | | | | |
| | 30 | 60 | 90 | 120 | 150 | 180 |
| 1 | 0 | 0 | 0 | 0 | 1 | 2 |
| 2 | 0 | 0 | 0 | 1 | 2 | 4 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 10 | — | — | — | — | — |

TABLE 6

| | Oil-Filled Cable Test | | |
|---|---|---|---|
| | Impulse Breakdown Strength (kV/mm) | | Rate of Thickness Change (%) of Insulating Layer after Heating |
| Insulating Oil | Initial | After Heating (100° C. × 30 days) | |
| 1 | 98 | 88 | 2 |
| 2 | 95 | 90 | 1 |
| 3 | 105 | 98 | 1 |
| 4 | 102 | 94 | 1 |
| 5 | 106 | 92 | 2 |
| 6 | 108 | 93 | 2 |
| 7 | 107 | 99 | 1 |
| 8 | 105 | 96 | 1 |
| 9 | 70 | 55 | 9 |

What is claimed is:
1. An electrical insulating oil comprising at least one member of diarylalkanes and at least one member selected from the group consisting of the compounds represented by the general formulae (I) to (IV):

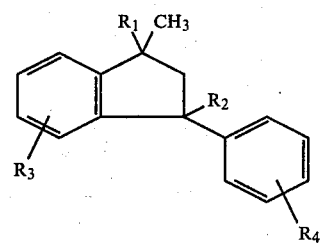

(I)

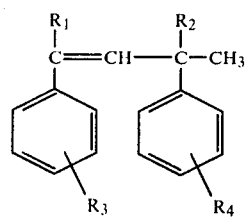

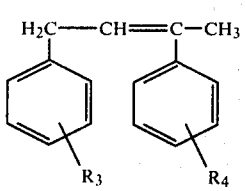

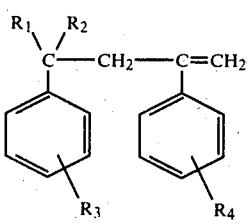

wherein each of $R_1$ to $R_4$ is a hydrogen atom or a methyl group and the total number of carbon atoms in $R_1$ to $R_4$ is an integer from zero to 2.

2. The electrical insulating oil in claim 1, wherein said insulating oil consists essentially of 1 part by weight of said diarylalkanes and 0.01 to 9 parts by weight of alkyl-3-arylindane derivatives represented by said formula (1) and/or 0.001 to 0.2 part by weight of 1,3-diarylbutene derivatives represented by said formulae (II) to (IV).

3. The electrical insulating oil in claim 1, wherein said diarylalkanes are diarylethanes.

4. The electrical insulating oil in claim 1, wherein the alkyl-3-arylindane derivative of said formula (I) is 1-methyl-3-phenylindane.

5. The electrical insulating oil in claim 1, wherein the 1,3-diarylbutene derivative of said formula (II) is 1,3-diphenylbutene-1.

6. The electrical insulating oil in claim 1, wherein the 1,3-diarylbutene derivative of said formula (III) is 1,3-diphenylbutene-2.

7. An oil-filled electrical appliance which is impregnated with an electrical insulating oil comprising at least one member of diarylalkanes and at least one member selected from the group consisting of the compounds represented by the general formulae (I) to (IV):

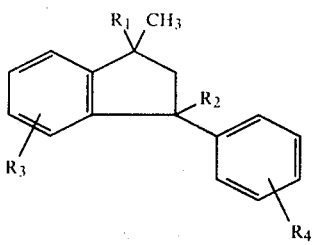

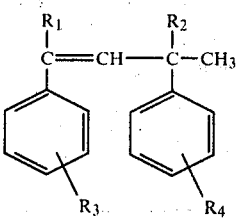

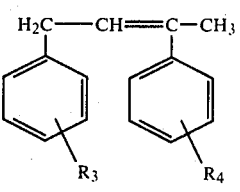

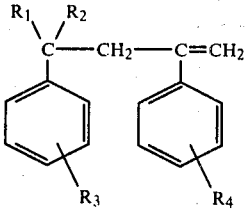

wherein each of $R_1$ to $R_4$ is a hydrogen atom or a methyl group and the total number of carbon atoms in $R_1$ to $R_4$ is an integer from zero to 2.

8. The oil-filled electrical appliance in claim 7, wherein said insulating oil consists essentially of 1 part by weight of said diarylalkanes and 0.01 to 9 parts by weight of alkyl-3-arylindane derivatives represented by said formula (1) and/or 0.001 to 0.2 part by weight of 1,3-diarylbutene derivatives represented by said formulae (II) to (IV).

9. The oil-filled electrical appliance in claim 7, wherein said diarylalkanes are diarylethanes.

10. The oil-filled electrical appliance in claim 7, wherein the alkyl-3-arylindane derivative of said formula (I) is 1-methyl-3-phenylindane.

11. The oil-filled electrical appliance in claim 7, wherein the 1,3-diarylbutene derivative of said formula (II) is 1,3-diphenylbutene-1.

12. The oil-filled electrical appliance in claim 7, wherein the 1,3-diarylbutene derivative of said formula (III) is 1,3-diphenylbutene-2.

13. The oil-filled electrical appliance in any one of claims 7 to 12, wherein said oil-filled electrical appliance is a capacitor.

14. The oil-filled electrical appliance in any one of claims 7 to 12, wherein said oil-filled electrical appliance is an oil-filled cable.

15. The oil-filled electrical appliance in any one of claims 7 to 12, wherein the insulating material used in said oil-filled electrical appliance is insulating paper or synthetic resin film or their combination.

16. The oil-filled electrical appliance in claim 15, wherein said synthetic resin film is polypropylene film or polyethylene film.

* * * * *